(12) United States Patent
Ghalami et al.

(10) Patent No.: US 12,340,634 B2
(45) Date of Patent: Jun. 24, 2025

(54) SYSTEMS AND METHODS USING DUAL VEHICLE DIGITAL TWINS FOR MODEL-BASED LEARNING AND REMOTELY-OPERATED VEHICLES

(71) Applicant: Ford Global Technologies, LLC, Dearborn, MI (US)

(72) Inventors: Laleh Ghalami, Troy, MI (US); James Wilhelm Heaton, Saline, MI (US); Praveen Kumar Yalavarty, Novi, MI (US); Sajit Janardhanan, Canton, MI (US); Navid Tafaghodi Khajavi, Troy, MI (US)

(*) Notice: Subject to any disclaimer, the term of this patent is extended or adjusted under 35 U.S.C. 154(b) by 314 days.

(21) Appl. No.: 17/660,140

(22) Filed: Apr. 21, 2022

(65) Prior Publication Data

US 2023/0343145 A1   Oct. 26, 2023

(51) Int. Cl.
- *G07C 5/00* (2006.01)
- *B60W 50/14* (2020.01)
- *G07C 5/08* (2006.01)

(52) U.S. Cl.
CPC ........... *G07C 5/008* (2013.01); *B60W 50/14* (2013.01); *G07C 5/0816* (2013.01); *B60W 2050/146* (2013.01)

(58) Field of Classification Search
CPC ..... G07C 5/008; G07C 5/0816; B60W 50/14; B60W 2050/146; G05B 17/02
See application file for complete search history.

(56) References Cited

U.S. PATENT DOCUMENTS

| | | | |
|---|---|---|---|
| 2017/0286572 A1 | 10/2017 | Hershey et al. | |
| 2019/0287079 A1 | 9/2019 | Shiraishi et al. | |
| 2019/0364248 A1* | 11/2019 | Katayama | H04N 7/181 |
| 2020/0051440 A1* | 2/2020 | Yousif | G08G 5/26 |
| 2020/0118053 A1* | 4/2020 | Chapin | G06Q 10/06315 |
| 2021/0287459 A1* | 9/2021 | Cella | G07C 5/0808 |
| 2021/0314417 A1* | 10/2021 | Chen | H04L 67/59 |
| 2022/0191648 A1* | 6/2022 | Smith | H04W 4/023 |
| 2023/0042433 A1* | 2/2023 | Singh | G07C 5/0808 |
| 2023/0297109 A1* | 9/2023 | Roux | G09B 23/28 701/2 |

OTHER PUBLICATIONS

Azad M. Madni et al., Leveraging Digital Twin Technology in Model-Based Systems Engineering, Appl. Syst. Innov 2021, 4, 36, Jan. 30, 2019.

Maulshree Singh et al., Digital Twin: Origin to Future, Appl. Syst. Innov. 2021, 4, 36, May 24, 2021.

* cited by examiner

*Primary Examiner* — Anne Marie Antonucci
*Assistant Examiner* — Jordan T Smith
(74) *Attorney, Agent, or Firm* — Emily Drake; Eversheds Sutherland (US) LLP

(57) ABSTRACT

This disclosure describes systems and using dual vehicle digital twins for model-based learning and remotely-operated vehicles. An example method may include receiving, by a processor associated with a first digital twin stored locally on a computing system of a vehicle or a second digital twin stored remotely on a first remote system, data relating to a first sub-system of the vehicle and a second sub-system of the vehicle. The example method may also include sending the data to the first digital twin or the second digital twin, wherein sending the data includes synchronizing with the first digital twin or the second digital twin.

13 Claims, 14 Drawing Sheets

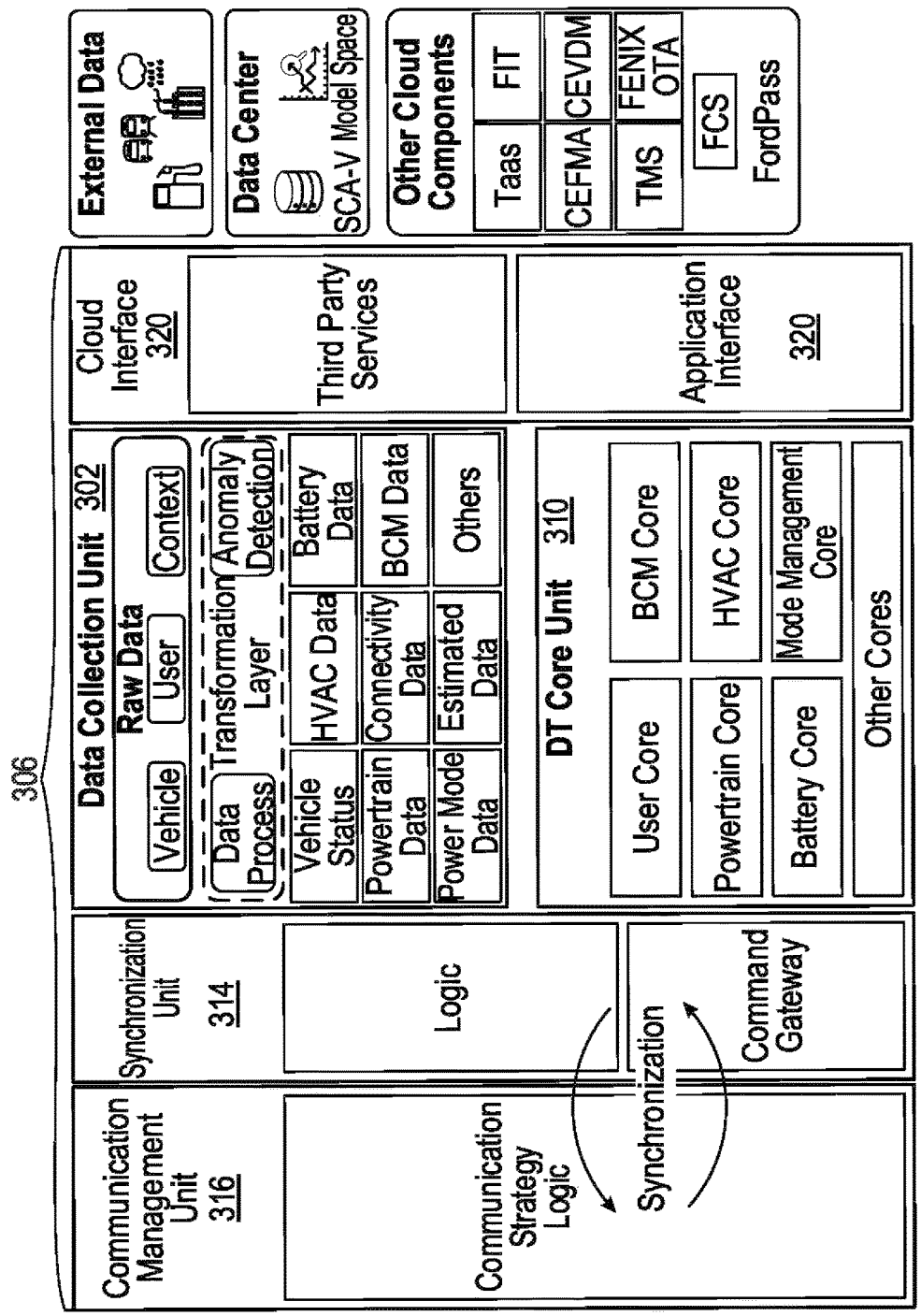
FIG. 3 (Cont...)

FIG. 9

SYSTEMS AND METHODS USING DUAL VEHICLE DIGITAL TWINS FOR MODEL-BASED LEARNING AND REMOTELY-OPERATED VEHICLES

BACKGROUND

A digital twin may be an exact, virtual copy of a real-world complex system and/or physical object that can be designed, tested, manufactured, and observed over time just like the real-world version. Digital twins can be used to understand, predict, optimize, and control the system without requiring physical access to the system. In this manner, the digital twin may provide a representation of a real-world system that changes over time as the real-world system changes.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

FIG. 9 illustrates an example user interface, in accordance with one or more embodiments of the disclosure.

DETAILED DESCRIPTION

Figure 1:
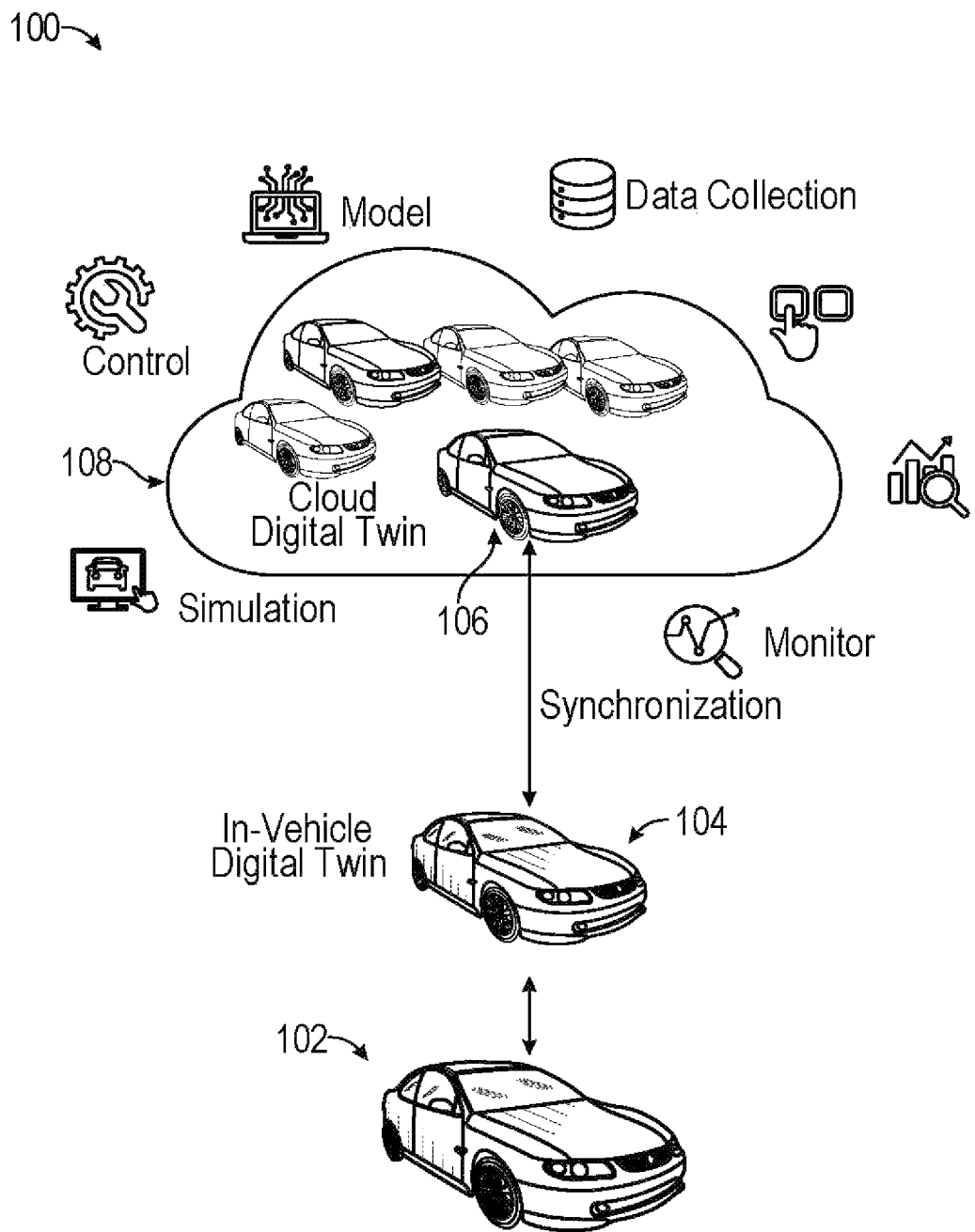
FIG. 1 illustrates an example system, in accordance with one or more embodiments of the disclosure.

This disclosure relates to, among other things, systems and methods using dual vehicle digital twins for model-based learning and remotely-operated vehicles. The systems and methods described herein more particularly involve the use of a dual digital twin configuration in which there are two digital copies of any sub-systems (for example, a powertrain sub-system, an HVAC sub-system, a battery system, etc., which may also be referred to as "systems," "components," and the like herein) included within a vehicle. One digital copy (e.g., one of the digital twins) is stored locally in the vehicle and a second digital copy (e.g., one of the digital twins) is stored in a remote system (for example, stored on "the cloud" on one or more remote servers that are located remotely from the vehicle). This dual digital twin configuration provides a unified and standard framework for data collection and processing, among other uses. The use of the dual digital twins may allow different systems external to the vehicle to interact with the "closest" digital twin, instead of solely relying on communications directly with the vehicle itself. This improves communications efficiency and reduces communications latency. For example, if a user is using a mobile device application to provide a command to the vehicle, the mobile device application may interact with the digital twin rather than directly with a system responsible for parking operations associated with the vehicle.

The use of the dual digital twins representing vehicle sub-systems may provide complex vehicle sub-systems in the form of a unified system to benefit both in-vehicle and cloud applications that may often interact with such vehicle sub-systems. Essentially, the dual digital twin may improve connectivity between such applications and the vehicle sub-systems. This dual digital twin configuration establishes a reliable and efficient connection between the cloud and the vehicle that simplifies communication between the cloud and the vehicle (such as, for example, command and control communications, data collection, etc.). This dual digital twin configuration also provides benefits to artificial intelligence applications in the sense that it provides the capability of running the same artificial intelligence model in both the cloud and locally at the vehicle. Also, when restrictions exist relating to obtaining a large volume of data from the vehicle by the cloud, the artificial intelligence model can be tuned in the digital twin local to the vehicle that is closer to the source of data, and then a delta may be sent to the cloud. For example, a data compression model may be trained for controller area network (CAN) signals in the vehicle, and only the model attributes (for example, the delta) may be sent to the cloud. This eliminates the need to send all of the data to the cloud from the vehicle.

Furthermore, in current systems, command and controls communications, data collections, and other types of communications between the vehicle and the cloud may be dependent on the architecture of the vehicle. This adds a layer of complexity when adding a new feature or modifying an existing feature in the vehicle. Another level of complexity arises from all different cloud components with their own configurations that might need to communicate to the vehicle. Therefore, a dual digital twin that includes two layers of interfaces (one on the cloud side and one on the vehicle side) may act as a middle layer between the cloud components and the vehicle to mitigate these complexities. Each digital twin may be unique to a vehicle and may include some or all of the required information and configurations specific to a particular vehicle architecture. The vehicle digital twin may translate this information based on a specific architecture, and the cloud interface may be a layer used to communicate with different systems on the cloud. Using this configuration, any new features that are designed for the vehicle may not need to be vehicle architecture-specific. Rather, a feature that is vehicle architecture agnostic may be developed, and then the digital twin may adjust the feature based on the architecture of the vehicle in which the feature may be implemented. Each digital twin may include five main components (and/or any other number of components). These components may be described in additional detail with respect to FIG. 3.

In one or more embodiments, a first component of a digital twin may include an interface with any other system that may interact with a vehicle. Such an interface may be a consistent interface across vehicle programs and may allow for vehicle units to interact with the closet digital twin. A closet digital twin may refer to a digital twin (for example, the digital twin stored locally at the vehicle or the cloud-based digital twin) that is closer to the system requesting to interact with the vehicle. For example, if a cloud application wants to communicate with the vehicle, the closest digital twin may be the cloud-based digital twin. However, if a mobile application is attempting to communicate with the vehicle to send a command (for example, unlock a door of the vehicle), and a user associated with a smartphone including the mobile application is proximate to the vehicle, then the closest digital twin may be the vehicle digital twin. For example, instead of communicating through the cloud, communications may be through Bluetooth for example. The interface may abstract the cloud applications from vehicle architecture changes and may enable the portability of applications. The interface may also provide isolated services, and therefore services may be abstracted from each other. The interface may also translate a generic command for a specific vehicle. As a result, feature developers may not need to focus on development that is specific to a specific vehicle architecture.

In one or more embodiments, a second component of a digital twin may include a data collection unit. The data collection unit may be responsible for collecting, cleansing, and transforming data in and out of the vehicle. The digital twin offers a unified data collection method rather than collecting data based on features. This may serve to remove duplication in the data collection process. This may also provide an in-vehicle data quality engine, may clean and normalize the data uniformly through transformation layers and anomaly detection. Both raw and normalized data may be available in the vehicle for different applications to use. Data collection in the vehicle may keep the real-time status of the vehicle. A data unit associated with the remote digital twin may maintain the last status of the vehicle and a time-to-live value. Once the time-to-live value expires, the data unit may update the vehicle status-based information stored by the in-vehicle digital twin.

In one or more embodiments, a third component of a digital twin may include a synchronization unit. The synchronization unit may be responsible for maintaining synchronization between the digital twin that is stored locally to the vehicle and the digital twin that is stored at the remote system (for example, on the cloud). By keeping the two digital twins closely synchronized, efficiency in communication and data transfer between the vehicle and cloud may be improved. Since the two digital twins may be closely synchronized, data transfer efficiency may be improved (e.g., less data transfer and a lower amount of duplicated data). The synchronization unit may also be responsible for validating each command. The synchronization unit offers two layers of validation for each command, one on the cloud and the other in the vehicle. The synchronization unit also validates, delays, and/or rejects commands based on the predefined rules.

In one or more embodiments, a fourth component may include core units. The core units may be the main processing units of the dual digital twins. The core units may allow for the construction of a distributed dual digital twin by building a digital twin of each vehicle module. This allows different sub-systems of the vehicle to be individually managed. A core unit may be responsible for all the computations and modeling related to its specific module. For example, one core unit may be associated with the vehicle powertrain system and may manage all computations and/or modeling for the vehicle powertrain sub-system. A core unit in the vehicle may be associated with a machine learning model, artificial intelligence model, and/or the like, and may train this model based on data received from the associated vehicle sub-system, as well as other feedback data, such as user inputs.

In one or more embodiments, a fifth component may include a communication management unit. The communication management unit may be responsible for selecting the most efficient wireless communication approach between the digital twin pair.

In one or more embodiments, the dual digital twins may be configured to re-create the state of a vehicle at any time in the past, as well as the present status of the vehicle. The dual digital twins may also be configured to separate the system complexities of the vehicle both locally to the vehicle and in the cloud. The in-vehicle digital twin may also be vehicle-aware and version-aware. The dual digital twin may be configured to be adaptable to the specifics of each vehicle, and also adapt to different versions of software within that vehicle. The dual digital twin may be configured to provide a time-series database which is the foundation for a consistent view of the state of a vehicle at previous points in time. In some cases, the synchronization between two digital twins may become the only communication channel between the cloud applications and the vehicle. Therefore, the dual digital twin provides a new way to perform communications with the real vehicle.

In one or more embodiments, the dual digital twin may be associated with a number of benefits in addition to any other aforementioned benefits. A first example benefit may include enabling a standardized, bandwidth optimized and prioritized way to communicate between the vehicle and cloud. A second example benefit may include abstracting cloud and in-vehicle applications from the vehicle architecture. A third example benefit may include enabling understanding, prediction, and optimization of the vehicle systems through the data and artificial intelligence models associated with the digital twins. A fourth example benefit may include facilitating the procedure of adding/modifying features to the vehicle. A fifth example method may include unifying data collection procedure (e.g., preventing data duplication).

FIG. 1 illustrates an example system 100, in accordance with one or more embodiments of the disclosure.

In one or more embodiments, the system 100 may illustrate a high-level system including the dual digital twins are described herein. The system 100 may include a vehicle 102, which may be associated with an in-vehicle digital twin 104. That is, the in-vehicle digital twin 104 may be stored in memory of the vehicle 102. The system may also include a second, cloud-based digital twin 106, which may be housed at a remote system, such as a remote server.

Figure 2:
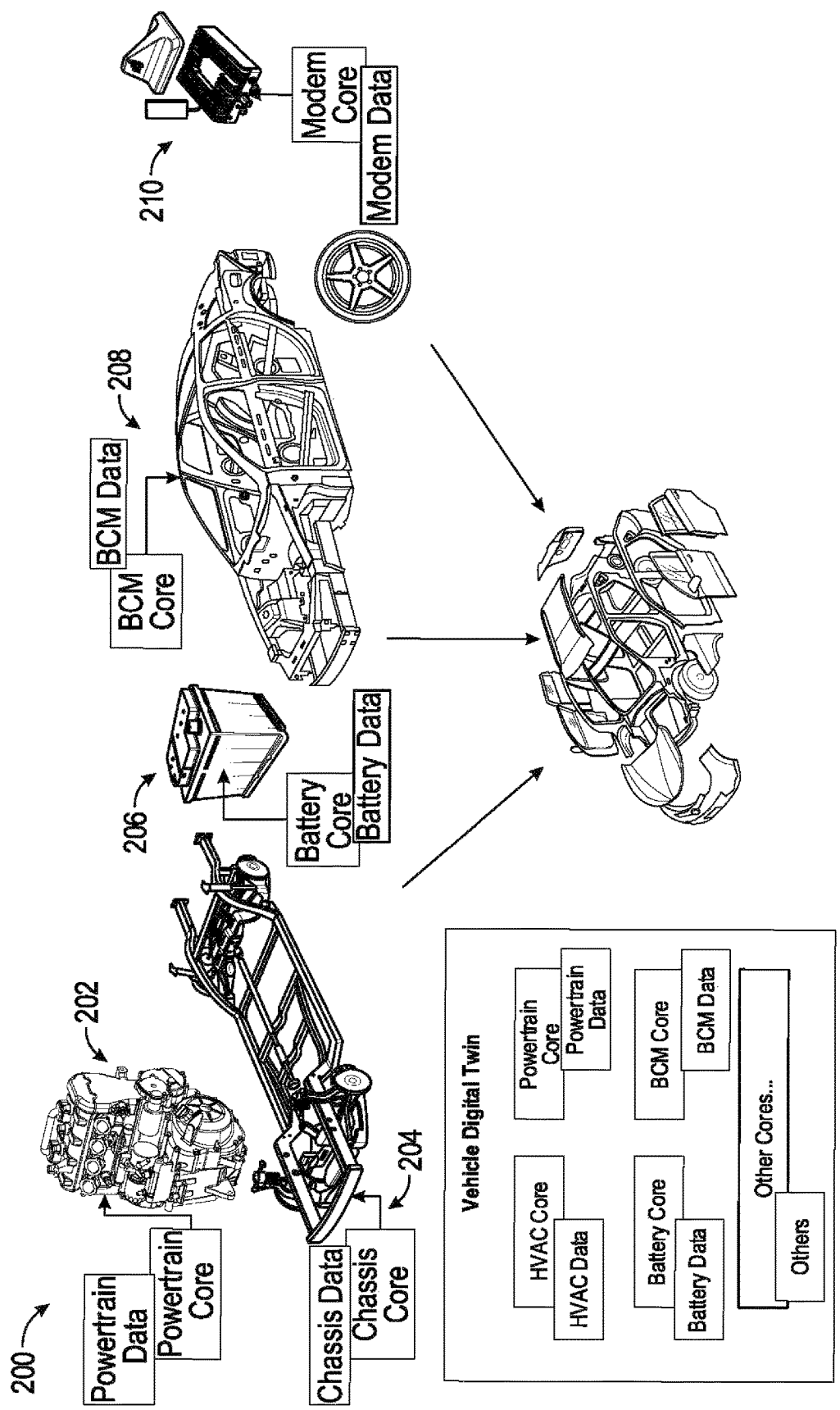
FIG. 2 illustrates an example system, in accordance with one or more embodiments of the disclosure.

FIG. 2 illustrates an example system 200, in accordance with one or more embodiments of the disclosure.

In one or more embodiments, the system 200 may illustrate some of the vehicle sub-systems from which data may be obtained to update the in-vehicle digital twin 212 (and also the cloud-based digital twin). For example, powertrain data 202, chassis data 204, battery data 206, BCM data 208, model data 210, and/or any other types of data from any other vehicle sub-systems. These may be referred to as "data collection components." The data collection components may collect any data from the vehicle and may produce unified data using a standardized data normalization procedure.

In one or more embodiments, the data collection and normalization procedure may include at least the following. First, the closest digital twin to a data source may collect the data and perform any pre-determined transformation on the data. Each digital twin may perform the same procedure for its own data source. For example, the vehicle digital twin may be the data source for the vehicle data and user data in the vehicle, but the cloud digital twin may be the data source for other data (for example, third-party data that is available on the cloud). There may also exist specific data tables for each core associated with the digital twins, or the associated physical vehicle sub-system. The dual digital twins may also include both converted and raw data, which may depend on a need associated with a specific use case. Each core associated with a digital representation of a different vehicle sub-component (for example, HVAC system, powertrain, etc.) may operate as an inference engine that applies a specific artificial intelligence model to the data that is included in a specific data collection table. In this manner, the digital twins may provide benefits in that any systems that desire to communicate with vehicle systems may instead interact with one of the digital twins. This may reduce the data processing and communication requirements of the vehicle systems themselves.

Figure 3:
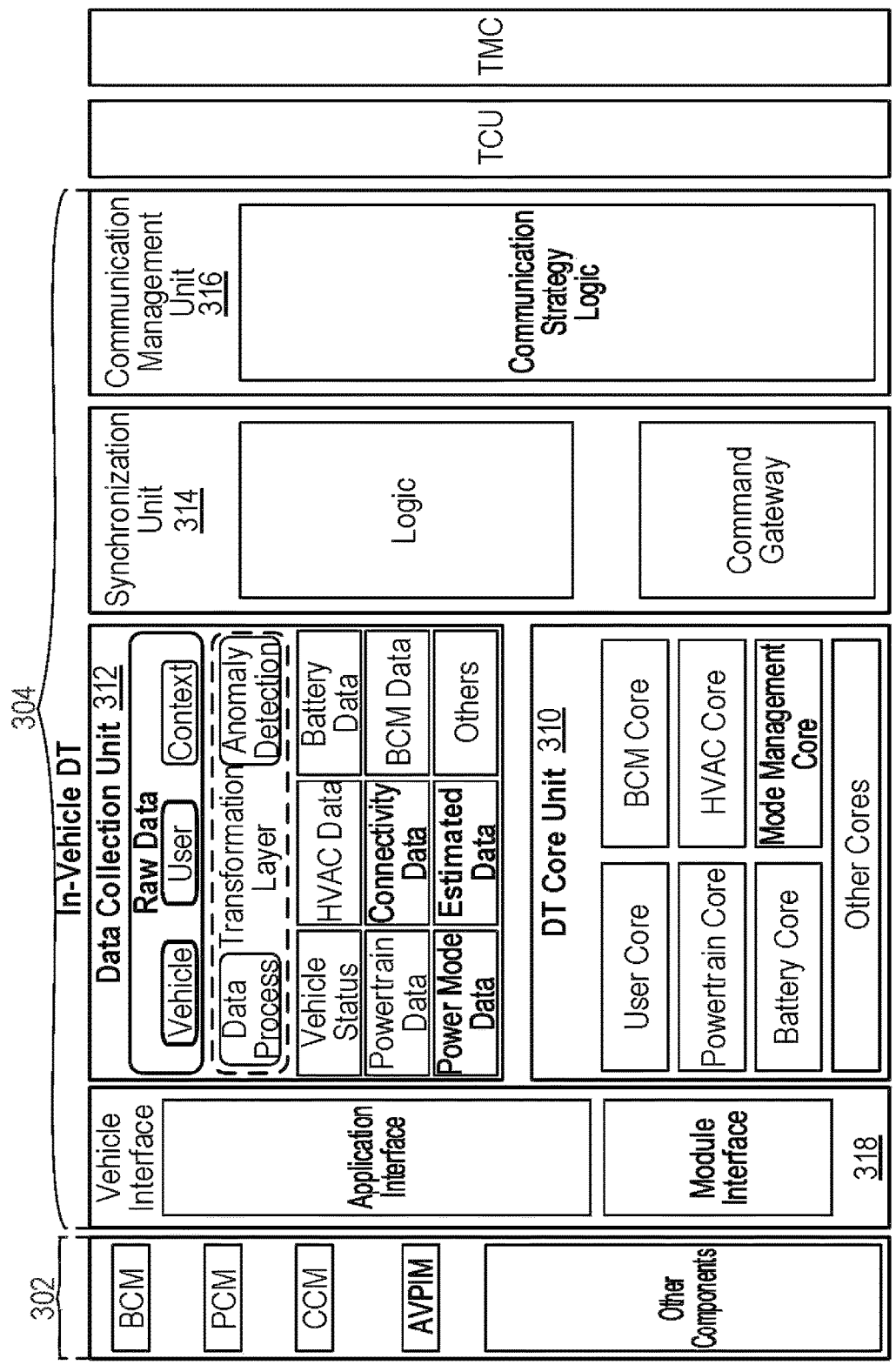
FIG. 3 illustrates an example system, in accordance with one or more embodiments of the disclosure.

FIG. 3 illustrates an example system 300, in accordance with one or more embodiments of the disclosure.

In one or more embodiments, the system 300 provides a more granular depiction of the dual digital twin system as described herein. As illustrated in the figure, the system 300 may include a first digital twin 304 (which may be stored locally in the vehicle) and a second digital twin 306 which may be stored remotely on the cloud. The system 300 may also include one or more vehicle systems 302 and/or any external data sources 305 (for example, traffic information, pollution data, weather data, etc.).

In one or more embodiments, each of the digital twins (for example, the first digital twin 304 and/or the second digital twin 306 may include at least a core unit 310, a data collection unit 312, a synchronization unit 314, and/or a communication management unit 316. The first digital twin 304 may also include a vehicle interface 318 and the second digital twin 306 may include a cloud interface 320.

In one or more embodiments, the core unit 310 may include the main processing unit of a digital twin where all the computations and predictions may occur. The core unit 310 may also be responsible for storing vehicle configurations and/or software knowledge based on the vehicle VIN number. In some cases, the core unit 310 may include a model, such as a machine learning model, artificial intelligence model, or the like. Such models may be employed to perform use case predictions. Such predictions, as well as training of any models, may be capable of being performed on either of the digital twins based on the specific use case and any associated constraints, such as a desired latency. For example, performing predictions using the local digital twin may result in a lower latency if a user is located at the vehicle.

The core units 310 may thus involve the creation of separate digital copies of data associated with each vehicle component (for example, powertrain, HVAC, etc.). Specifically for the cloud-based digital twin, such digital copies of data associated with vehicle components may be useful for the simulation and testing of different scenarios in order to set attributes for that specific component Additionally, different artificial intelligence models may be associated with each vehicle component. For example, a core unit 310 associated with the vehicle's HVAC system may use different models specific to climate control system. For example, the model may predict the most convenient setting for the climate control system, or the recirculation window. These individual models may read data from an individual data table associated with the core unit 310, and may also store individual core configurations.

In one or more embodiments, the data collection unit 312 may be responsible for collecting, cleansing, and transforming data in and out of the vehicle. The digital twin (for example, the first digital twin 304 and/or the second digital twin 306) offers a unified data collection process rather than collecting data based on features. The data collection unit 312 also provides an in-vehicle data quality engine, which cleans and normalizes the data uniformly through transformation layers and/or anomaly detection. Both raw and normalized data may be available in the vehicle for different applications to use. The data collection unit 312 associated with the first digital twin 304 may also maintain the real-time status of the vehicle. The data collection unit 312 associated with the second digital twin 306 may maintain the last status of the vehicle and a time-to-live associated with that status. Once this time-to-live expires, the data collection unit 312 on the second digital twin 306 may obtain a current status of the vehicle from the first digital twin 304. In one or more embodiments, the synchronization unit 314 may be responsible for maintaining synchronization between the first digital twin 304 and the second digital twin 306 using the best synchronization mechanism. The synchronization unit 314 may be responsible for validating each command. The synchronization unit 314 may offer two layers of validation for each command, one on the cloud and the other in the vehicle. For example, before sending the unlock command to the vehicle, the cloud-based digital twin may determine the status of the vehicle. For example, if the cloud-based digital twin determines that the vehicle is driving, a command may not be sent to the vehicle or may be delayed until the vehicle is no longer driving.

In one or more embodiments, the communication management unit 316 may be responsible for selecting the most efficient wireless communication approach between the first digital twin 304 and the second digital twin 306.

In one or more embodiments, the vehicle interface 318 and/or the cloud interface 320 may be a consistent interface across vehicle programs, which may allow vehicle units to interact with a closet digital twin. The interfaces may also abstract the cloud applications from the vehicle architecture changes and may enable the portability of applications. The interfaces may also provide isolated services. Translates the generic command for a specific vehicle. The interfaces may include at least two main components, including hardware, and application interfaces.

Figure 4:
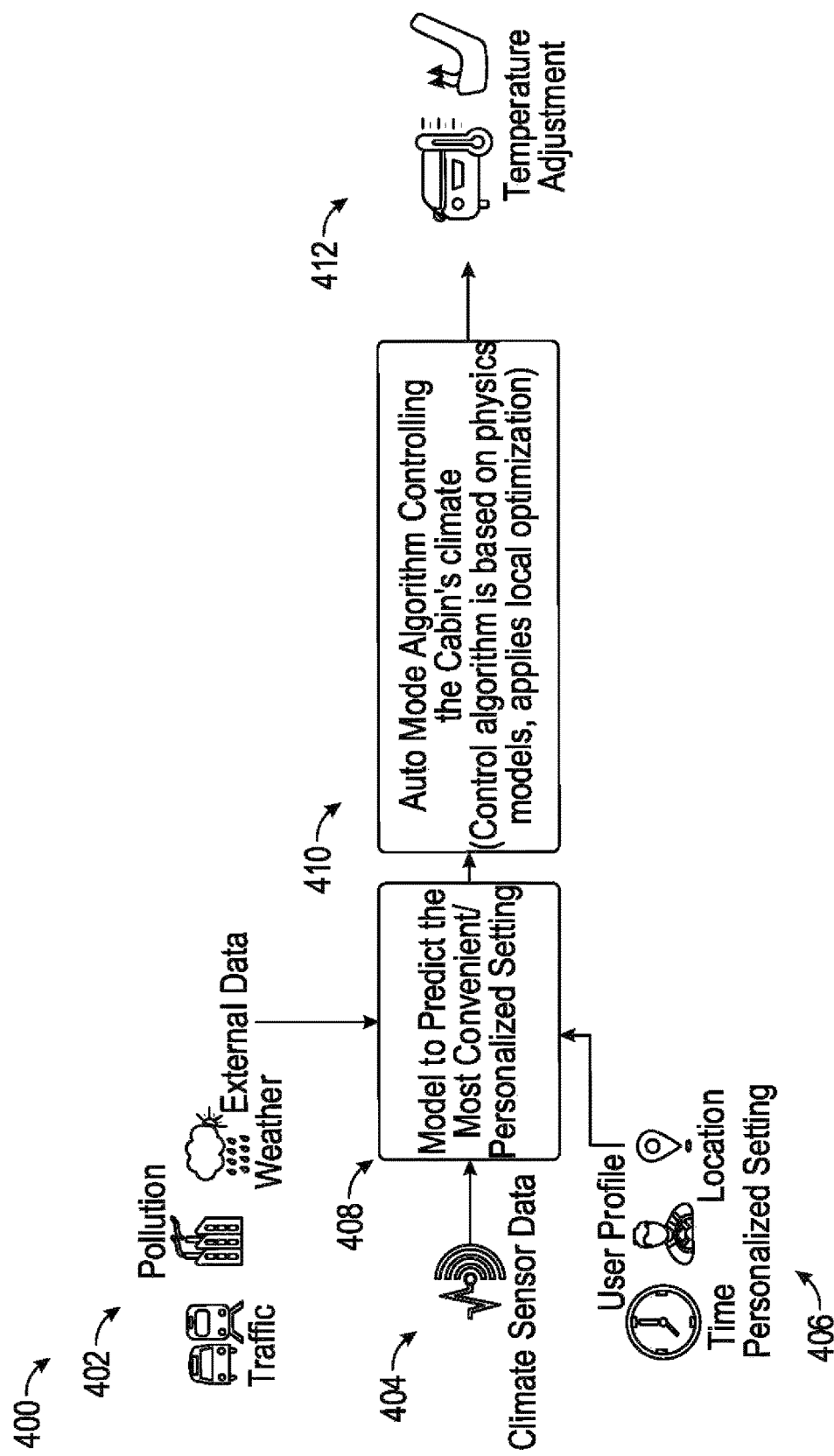
FIG. 4 illustrates an example use case, in accordance with one or more embodiments of the disclosure.

FIG. 4 illustrates an example use case 400, in accordance with one or more embodiments of the disclosure.

In one or more embodiments, the example use case 400 may include one non-limiting use case associated with the dual digital twins. Particularly, the use case 400 may involve the prediction of the most desired HVAC settings for the vehicle in any given scenario. The use case 400 may begin with data collection. Such data may include at least external data 402, climate sensors data 404, and/or personalized settings data 406. For example, the use case 400 may involve a smart HVAC system using multiple data sources (for example, the vehicle data, the user preferences, the external data such as traffic info/pollution data and weather) that adjusts the recirculation window (of the vehicle) and activates fresh air recirculation in the cabin of the vehicle. The use case 400 illustrated in FIG. 4 is merely one example of a use case associated with one core of a digital twin (for example, a core associated with an HVAC sub-system of the vehicle). Any other number of use cases may also be applicable to any other types of sub-systems as well. For example, use cases relating to the operation of the vehicle power train, etc.

FIGS. 5-10 illustrate example user interfaces, in accordance with one or more embodiments of the disclosure.

Figure 5:
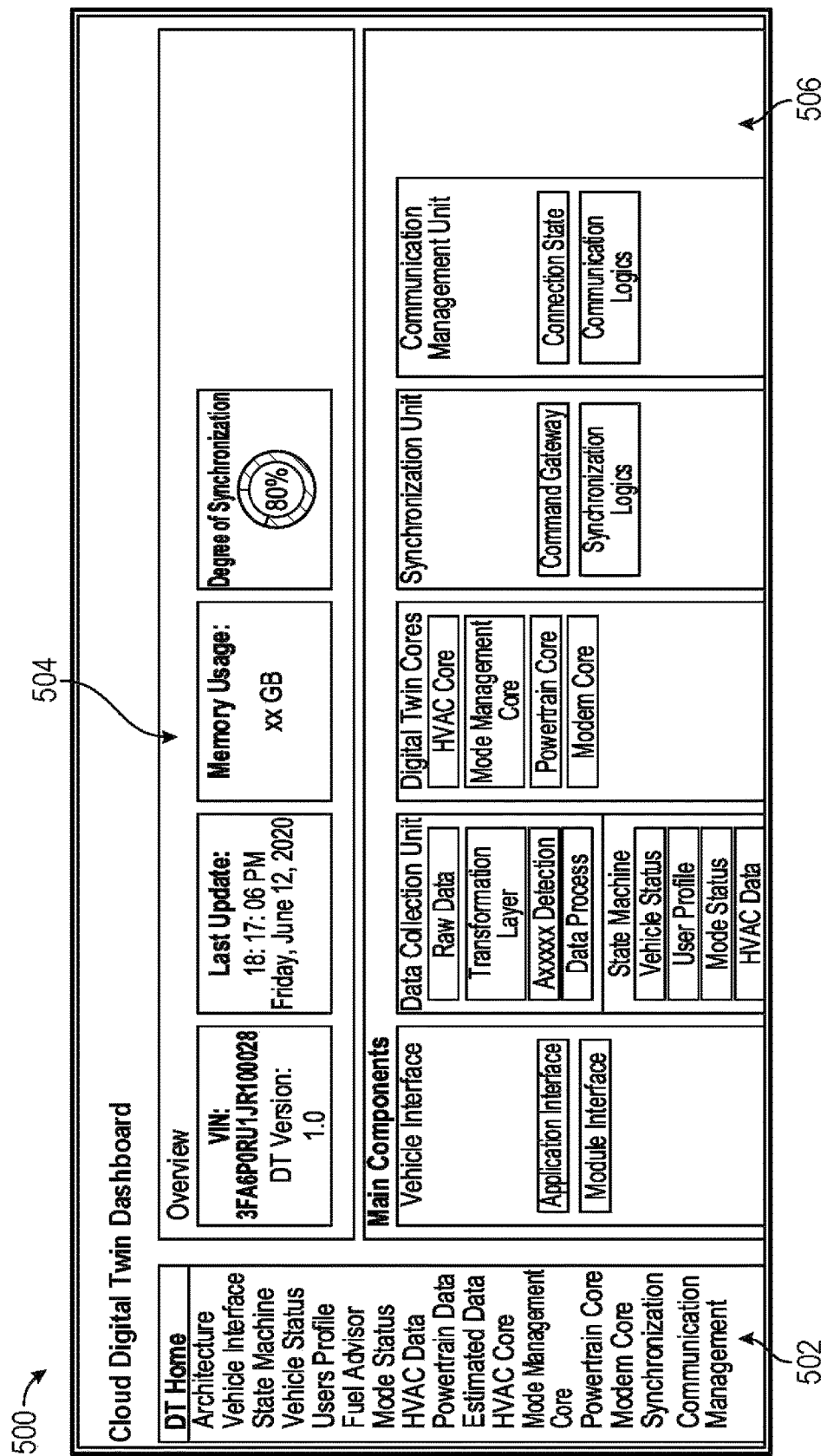
FIG. 5 illustrates an example user interface, in accordance with one or more embodiments of the disclosure.

Beginning with FIG. 5, a first user interface 500 is illustrated. The first user interface 500 provides an illustration of a dashboard that may be accessed by a user to view information associated with the cloud-based digital twin. The user interface 500 may include a navigation menu 502. The navigation menu 500 may allow a user to select different types of data to view through the dashboard. For example, the user may be able to view vehicle status information, HVAC data, fuel advisor information, etc.

Figure 6:
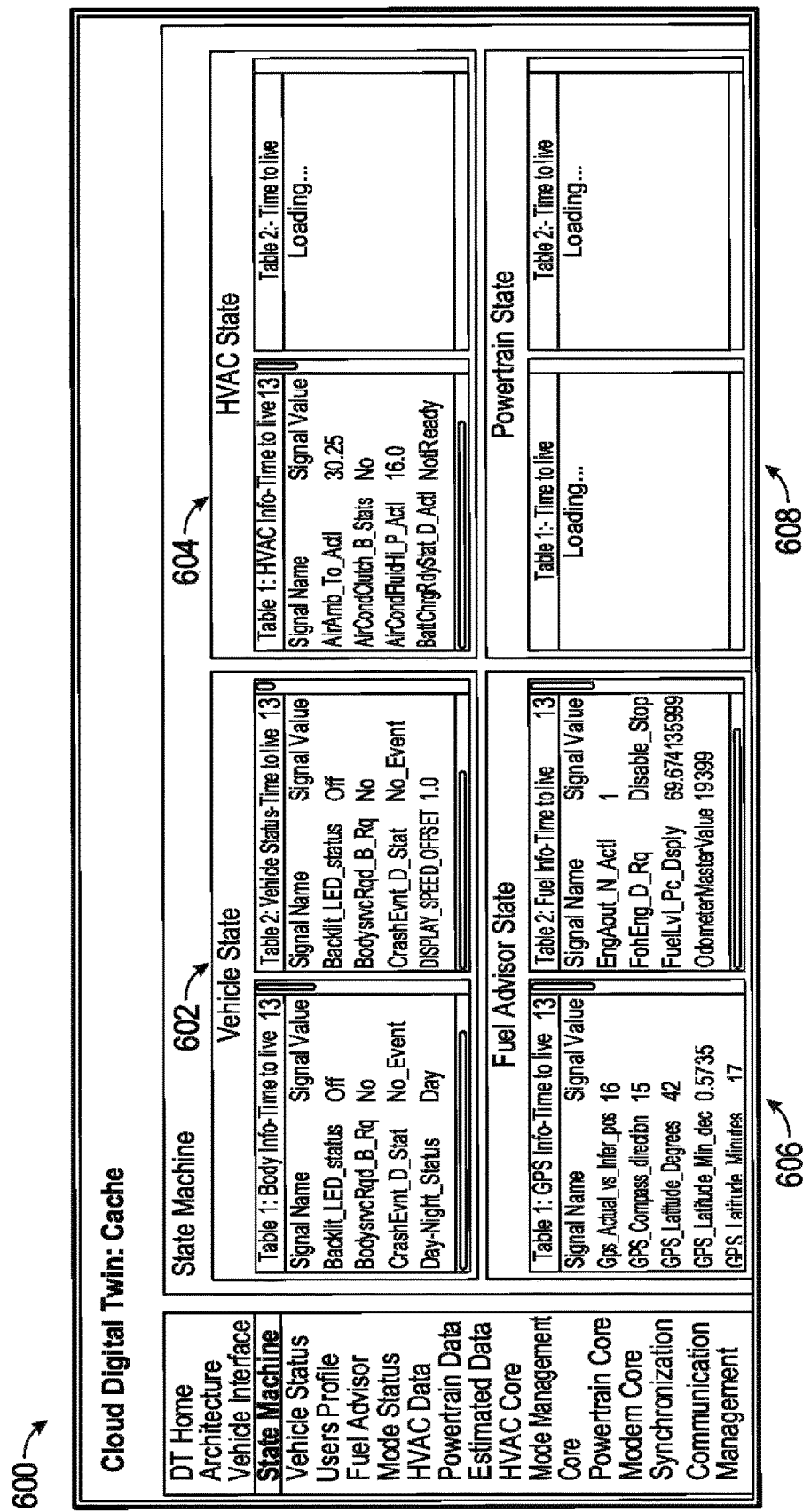
FIG. 6 illustrates an example user interface, in accordance with one or more embodiments of the disclosure.

FIG. 6 illustrates a second user interface 600. The second user interface 600 may illustrate the same dashboard illustrated in FIG. 5, but may depict example state machine information that may be presented to a user upon selection of the "State Machine" option in the navigation menu 502. For example, the dashboard may be depicted as presenting vehicle state information 602, HVAC state information 604, fuel advisor state information 606, and/or powertrain state information 608. Any of the signals may originate from different data sources. For example, some or all of the signals may be received from the CAN bus of the vehicle and/or any other data source. The signals that are displayed may also be user-configurable.

Figure 7:
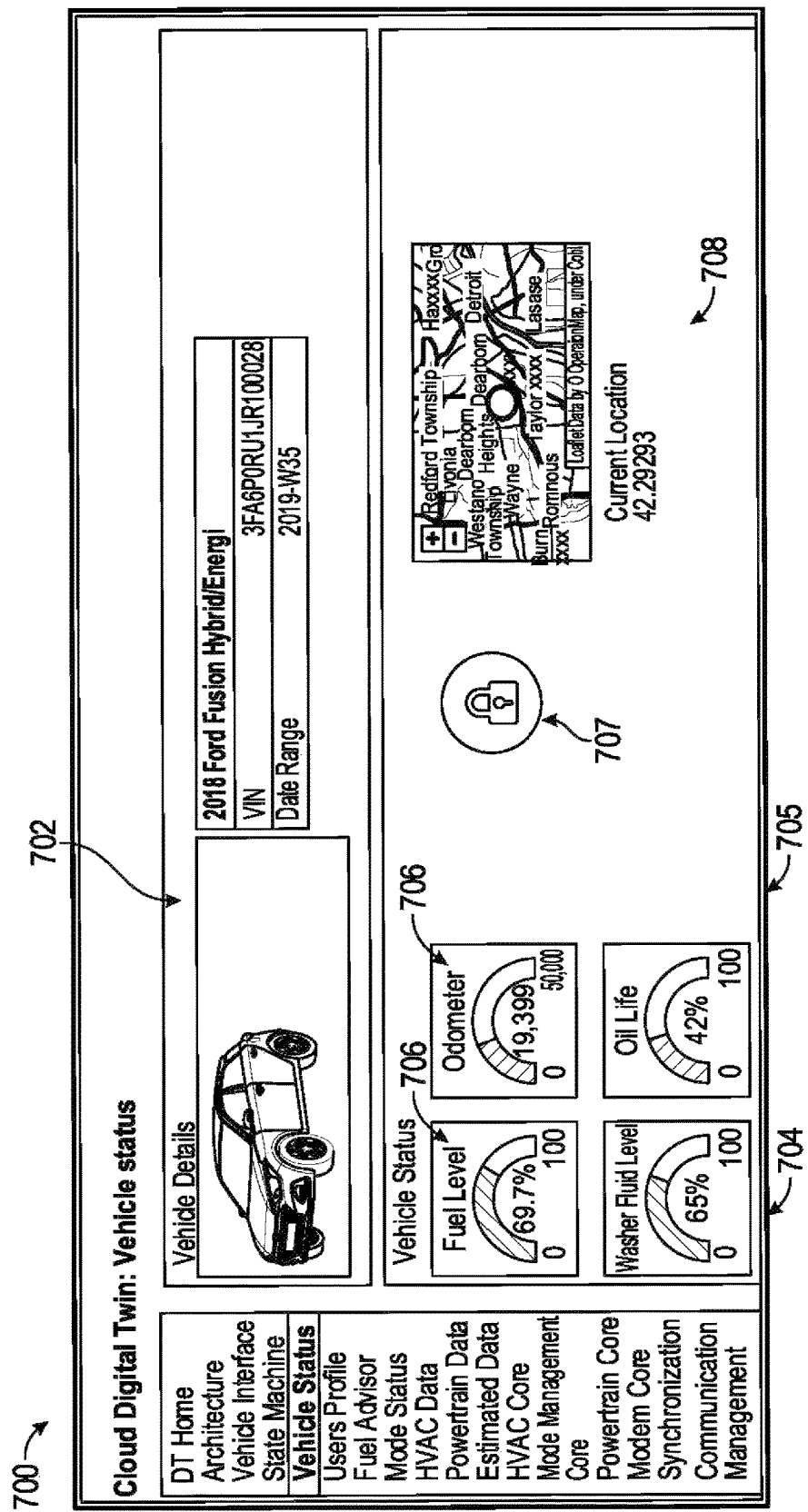
FIG. 7 illustrates an example user interface, in accordance with one or more embodiments of the disclosure.

FIG. 7 illustrates a third user interface 700. The third user interface 700 may illustrate the same dashboard illustrated in FIG. 5 but may depict example vehicle status information that may be presented to a user upon selection of the "Vehicle Status" option in the navigation menu 502. For example, the dashboard may present vehicle details 702, such as a year, make, and/or model of the vehicle, a VIN number associated with the vehicle, and/or any other vehicle information. The dashboard may also present vehicle status information, such as a washer fluid level 704, an oil level 705, a fuel level 706, an odometer reading 706, a lock status 707, and/or a current location 708 of the vehicle.

Figure 8:
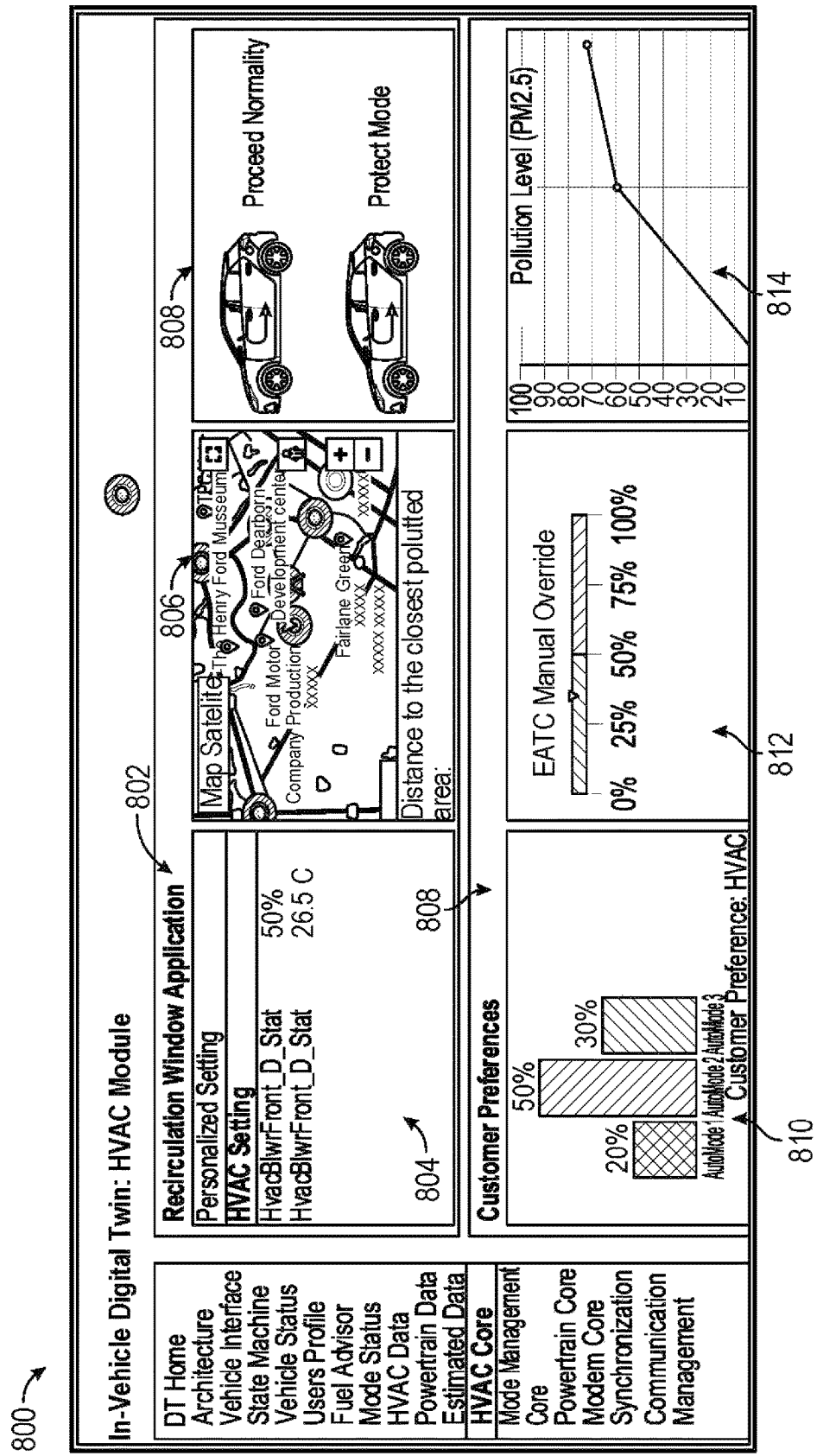
FIG. 8 illustrates an example user interface, in accordance with one or more embodiments of the disclosure.

FIG. 8 illustrates a fourth user interface 800. The fourth user interface 800 may illustrate the same dashboard illustrated in FIG. 5 but may depict example HVAC core information that may be presented to a user upon selection of the "HVAC Core" option in the navigation menu 502. For example, the dashboard may present a recirculation window application 802. The recirculation window application 802 may include personalized HVAC settings 804, a map 806 including indications of polluted areas, and/or a protect mode. The protect mode may be related to the smart HVAC system use case (for example, use case 400). In the case that the vehicle gets close to a polluted area, the vehicle may activate the protect mode to close the recirculation window and activate the fresh air inside the cabin. The dashboard may also present customer preferences, which may capture information about when and how a user overrides or uses the provided automatic climate modes in the vehicle. This allows for a model to predict the most desirable setting for the user.

Figure 9:
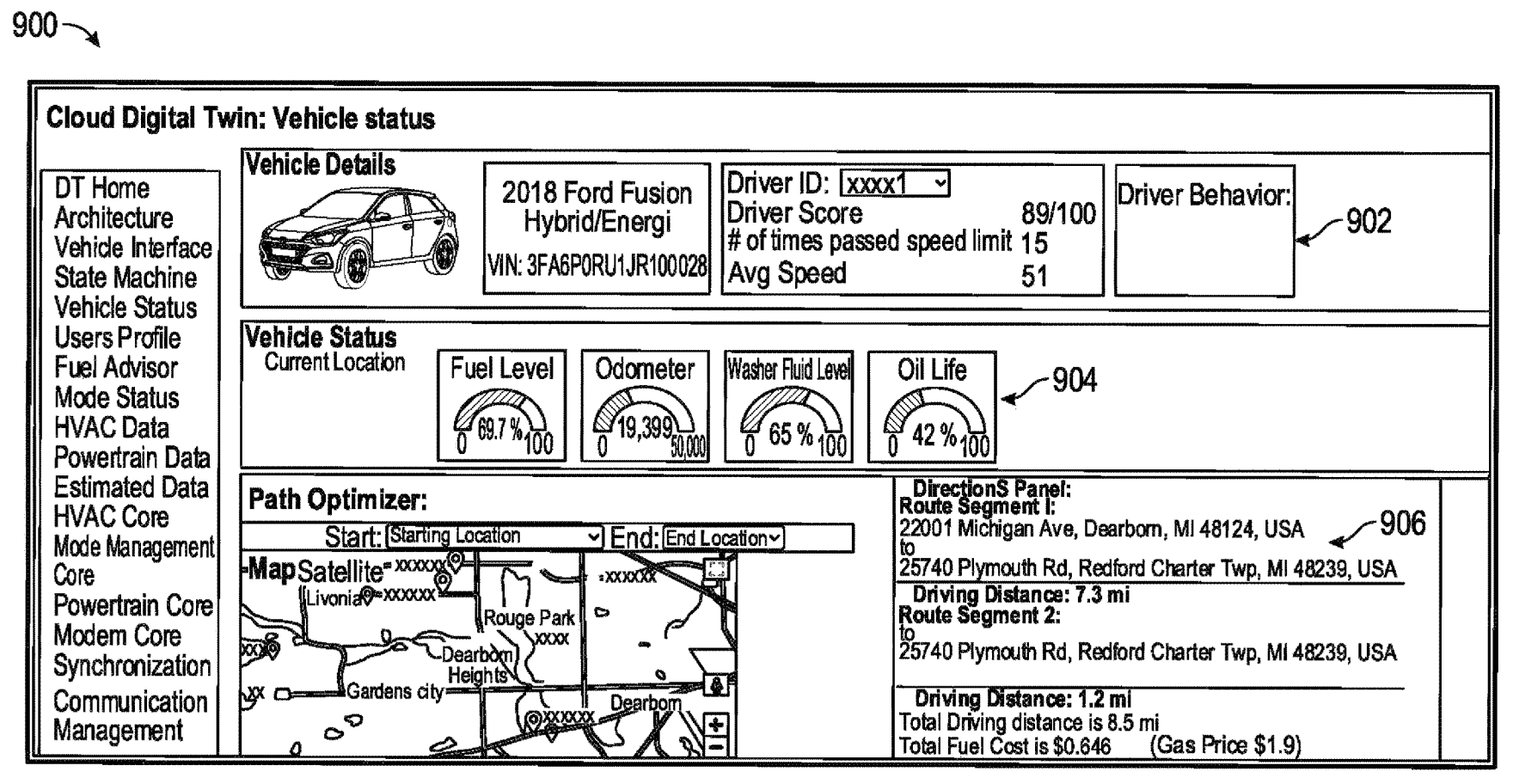

FIG. 9 illustrates a fifth user interface 900. The fifth user interface 900 may illustrate the same dashboard illustrated in FIG. 5 but may depict example fuel advisor information that may be presented to a user upon selection of the "Fuel Advisor" option in the navigation menu 502. For example, the dashboard may present vehicle and/or driver details 902, including a driver score, a number of times the driver has passed the speed limit, an average speed, etc. The dashboard may also present vehicle status information 904, which may include the washer fluid level 704, oil level 705, fuel level 706, and/or odometer reading 706 that are presented in the user interface 700. The dashboard may also present a path optimizer 906, which may optimize fuel economy for a vehicle navigating to a destination.

Figure 10:
FIG. 10 illustrates an example user interface, in accordance with one or more embodiments of the disclosure.

FIG. 10 illustrates a sixth user interface 1000. The sixth user interface 1000 may illustrate the same dashboard illustrated in FIG. 5 but may depict example fuel advisor information that may be presented to a user upon selection of the "Users Profile" option in the navigation menu 502. For example, the dashboard may present a number of different user profiles associated with different users that use the vehicle. The user interface 1000 depicts three different user profiles (a first user profile 1002, a second user profile 1004, and/or a third user profile 1006). Each of the user profiles may present information specific to the user, such as personal identifying information, driver behavior, a total number of miles driver by the user, a total number of hours driven by the user, a seat preference, an average vehicle cabin temperature, a favorite media type, etc.

Figure 11:
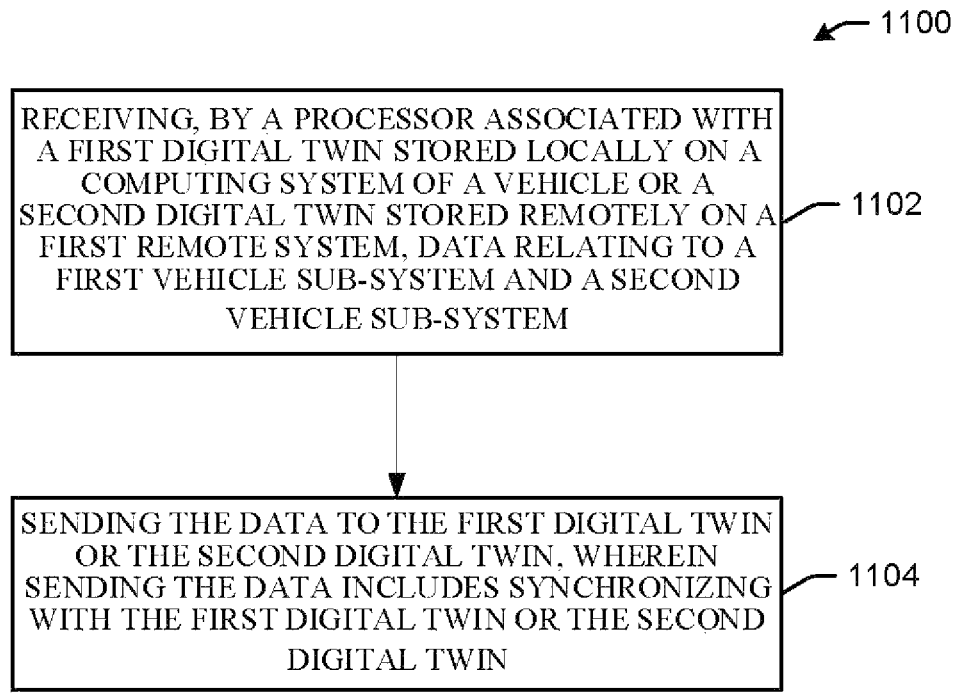
FIG. 11 illustrates an example method, in accordance with one or more embodiments of the disclosure.

FIG. 11 illustrates an example method 1100, in accordance with one or more embodiments of this disclosure. At block 1102, the method 1100 may include receiving, by a processor associated with a first digital twin stored locally on a computing system of a vehicle or a second digital twin stored remotely on a first remote system, data relating to a first sub-system of the vehicle and a second sub-system of the vehicle. At block 1104, the method 1100 may include sending the data to the first digital twin or the second digital twin, wherein sending the data includes synchronizing with the first digital twin or the second digital twin.

In one or more embodiments, the first digital twin and the second digital twin include a digital representation of the first vehicle sub-system and a digital representation of the second vehicle sub-system.

In one or more embodiments, the first digital twin and the second digital twin include a first artificial intelligence model associated with the digital representation of the first vehicle sub-system and a second artificial intelligence model associated with the digital representation of the second vehicle sub-system.

In one or more embodiments, the first artificial intelligence model is configured to produce an output used to adjust a configuration of the first vehicle sub-system.

In one or more embodiments, the method 1100 further comprises receiving a communication from a second remote system or a device, wherein the communication is received by the first digital twin instead of the second digital twin based on a determination that the second remote system or the device is within a threshold distance of the vehicle. In one or more embodiments, the method 1100 further comprises receiving a communication from a second remote system or a device, wherein the communication is received by the second digital twin instead of the first digital twin based on a determination that the second remote system or the device is beyond a threshold distance of the vehicle.

Figure 12:
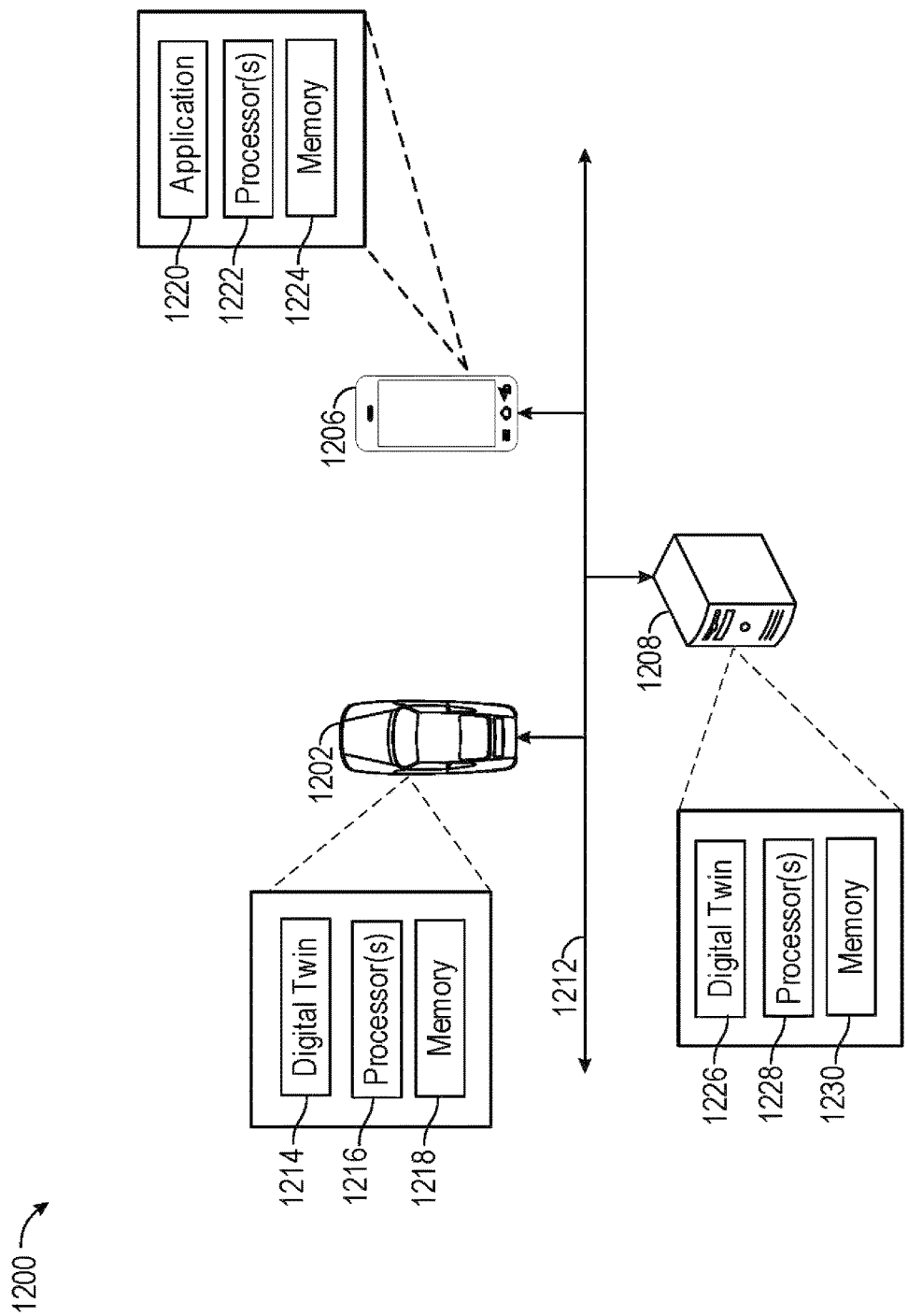
FIG. 12 illustrates an example of a system, in accordance with one or more embodiments of this disclosure.

FIG. 12 illustrates an example of a computing system 1200, in accordance with one or more embodiments of this disclosure. In one or more embodiments, the system 1200 may include at least one or more vehicles 1202, one or more user devices 1206, and/or one or more servers 1208.

In one or more embodiments, a vehicle 1202 may be a vehicle that may include any type of vehicle (for example, electric vehicle, hybrid vehicle, internal combustion engine vehicle, autonomous or semi-autonomous vehicle, etc.). The vehicle may include any number of different types of sub-systems (for example, as illustrated in FIG. 2), such as a powertrain, a chassis, a battery, a BCM, a modem, and/or any other number of sub-systems. The vehicle 1202 may also include a local digital twin 1214 that may obtain data relating to any of these different sub-systems of the vehicle (as well as other types of data, such as user data, external data, such as weather data traffic data, etc., and/or any other types of data).

In one or more embodiments, the one or more user devices 1206 may be any types of devices, such as smartphones, laptop computers, desktop computers, tablets, etc. that may be used by a user. A mobile device 1206 may include an application 1220 that may allow a user to view one or more interfaces (for example, the interfaces illustrated in FIGS. 5-10, and/or any other interfaces associated with the dual digital twins described herein). That is, the application 1220 may allow the user to interact with one of the digital twins to view information about the vehicle and/or interact with vehicle systems.

In one or more embodiments, the one or more servers 1208 may be remote servers that may be used to store the second digital twin as described herein.

Figure 13:
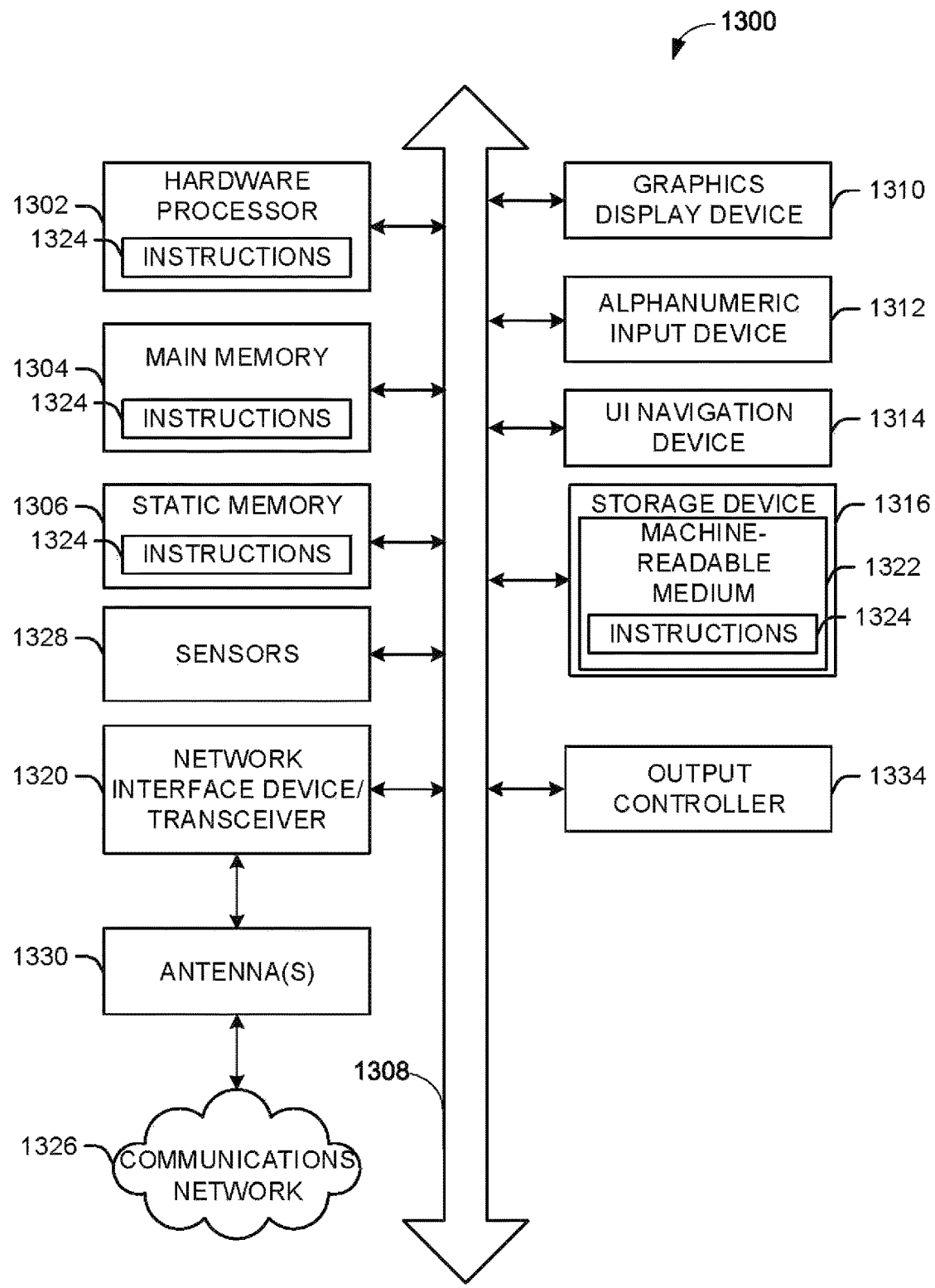
FIG. 13 illustrates an example of a computing system, in accordance with one or more embodiments of this disclosure.

In one or more embodiments, any of the one or more vehicles 1202, one or more user devices 1206, and/or one or more servers 1208 and/or any other elements of the system 1200 may include any of the components of the machine 1300 described with respect to FIG. 13. That is, as illustrated in the figure, these elements of the system 1200 may include one or more processor(s) and memory, as well as at least any other elements described as being included in the machine 130000. That is, although the figure may only depict a particular element of system 1200 as having one or more processors, memory, and one or more modules, this may not be intended to be limiting in any way.

FIG. 13 depicts a block diagram of an example machine 1300 upon which any of one or more techniques (e.g., methods) may be performed, in accordance with one or more example embodiments of the present disclosure. In other embodiments, the machine 1300 may operate as a stand-alone device or may be connected (e.g., networked) to other machines. In a networked deployment, the machine 1300 may operate in the capacity of a server machine, a client machine, or both in server-client network environments. In an example, the machine 1300 may act as a peer machine in peer-to-peer (P2P) (or other distributed) network environments. The machine 1300 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1300 may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink (e.g., bus) 1308. The machine 1300 may further include a graphics display device 1310, an alphanumeric input device 1312 (e.g., a keyboard), and a user interface (UI) navigation device 1314 (e.g., a mouse). In an example, the graphics display device 1310, alphanumeric input device 1312, and UI navigation device 1314 may be a touch screen display. The machine 1300 may additionally include a storage device (i.e., drive unit) 1316, a network interface device/transceiver 1320 coupled to antenna(s) 1330, and one or more sensors 1328, such as a global positioning system (GPS) sensor, a compass, an accelerometer, or other sensor. The machine 1300 may include an output controller 1334, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 1316 may include a machine readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within the static memory 1306, or within the hardware processor 1302 during execution thereof by the machine 1300. In an example, one or any combination of the hardware processor 1302, the main memory 1304, the static memory 1306, or the storage device 1316 may constitute machine-readable media.

While the machine-readable medium 1322 is illustrated as a single medium, the term "machine-readable medium" may include a single medium or multiple media (e.g., a centralized or distributed database, and/or associated caches and servers) configured to store the one or more instructions 1324.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1300 and that cause the machine 1300 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1324 may further be transmitted or received over a communications network 1326 using a transmission medium via the network interface device/transceiver 1320 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1320 may include one or more physical jacks (e.g., Ethernet, coaxial, or phone jacks) or one or more antennas to connect to the communications network 1326. In an example, the network interface device/transceiver 1320 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1300 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, certain systems and methods. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A system comprising:
    a vehicle including a first digital twin stored locally on a computing system of the vehicle;
    a first remote system including a second digital twin, wherein the first digital twin is a data source for a first type of data, wherein the second digital twin is a data source for a second type of data, and wherein the first type of data and the second type of data are different, wherein the first type of data comprises at least one of: vehicle data or user data, and wherein the second type of data comprises third party data;
    one or more processors; and
    a memory storing computer-executable instructions, that when executed by the one or more processors, cause the one or more processors to:
    receive, by the first digital twin, the first type of data relating to a first vehicle sub-system and a second vehicle sub-system;
    send, by the first digital twin, the first type of data to the second digital twin, wherein sending the first type of data comprises synchronizing with the second digital twin;
    receive, by the second digital twin, the second type of data;
    send, by the second digital twin, the second type of data to the first digital twin, wherein sending the second type of data comprises synchronizing with the first digital twin;
    determine, at a first time, that a second remote system or a device is attempting to send a first command to the vehicle;
    determine that the second remote system or the device is within a threshold distance of the vehicle;
    send, based on the determination that the second remote system or the device is within the threshold distance of the vehicle, the command to the vehicle via the first digital twin instead of the second digital twin;
    determine, at a second time, that the second remote system or the device is attempting to send a second command to the vehicle;
    determine, at a second time, that the second remote system or the device is outside of the threshold distance of the vehicle; and
    send, based on the determination that the second remote system or the device is outside of the threshold distance of the vehicle, the command to the vehicle via the second digital twin instead of the first digital twin.

2. The system of claim 1, wherein the first digital twin and the second digital twin include a digital representation of the first vehicle sub-system and a digital representation of the second vehicle sub-system.

3. The system of claim 2, wherein the first digital twin and the second digital twin include a first artificial intelligence model associated with the digital representation of the first vehicle sub-system and a second artificial intelligence model associated with the digital representation of the second vehicle sub-system.

4. The system of claim 3, wherein the first artificial intelligence model is configured to produce an output used to adjust a configuration of the first vehicle sub-system.

5. The system of claim 1, wherein the computer-executable instructions further cause the one or more processors to:
    present a user interface including vehicle identifying data, fuel data, navigation data, heating, ventilation, and air conditioning (HVAC) data, wherein the user interface comprises one or more user profiles.

6. A system comprising:
    a vehicle including a first digital twin stored locally on a computing system of the vehicle;
    a first remote system including a second digital twin;
    one or more processors; and
    a memory storing computer-executable instructions, that when executed by the one or more processors, cause the one or more processors to:
    receive data relating to a first vehicle sub-system and a second vehicle sub-system;
    send the data to the first digital twin, wherein sending the data comprises synchronizing with the first digital twin;
    determine, at a first time, that a second remote system or a device is attempting to send a first command to the vehicle;
    determine that the second remote system or the device is within a threshold distance of the vehicle;
    send, based on the determination that the second remote system or the device is within the threshold distance of the vehicle, the command to the vehicle via the first digital twin instead of the second digital twin;
    determine, at a second time, that the second remote system or the device is attempting to send a second command to the vehicle;
    determine, at a second time, that the second remote system or the device is outside of the threshold distance of the vehicle;
    send, based on the determination that the second remote system or the device is outside of the threshold distance of the vehicle, the command to the vehicle via the second digital twin instead of the first digital twin; and
    present a user interface including vehicle identifying data, fuel data, navigation data, heating, ventilation, and air conditioning (HVAC) data, wherein the user interface comprises one or more user profiles.

7. The system of claim 6, wherein the first digital twin and the second digital twin include a digital representation of the first vehicle sub-system and a digital representation of the second vehicle sub-system.

8. The system of claim 7, wherein the first digital twin and the second digital twin include a first artificial intelligence model associated with the digital representation of the first vehicle sub-system and a second artificial intelligence model associated with the digital representation of the second vehicle sub-system.

9. The system of claim 8, wherein the first artificial intelligence model is configured to produce an output used to adjust a configuration of the first vehicle sub-system.

10. A method comprising:
receiving, by a processor associated with a first digital twin stored locally on a computing system of a vehicle or a second digital twin stored remotely on a first remote system, a first type of data relating to a first vehicle sub-system and a second vehicle sub-system, wherein the first digital twin is a data source for a first type of data, wherein the second digital twin is a data source for a second type of data, and wherein the first type of data and the second type of data are different, wherein the first type of data comprises at least one of: vehicle data or user data, and wherein the second type of data comprises third party data;
sending, by the first digital twin, the first type of data to the second digital twin, wherein sending the first type of data includes synchronizing with the second digital twin;
receiving, by the second digital twin, the second type of data;
sending, by the second digital twin, the second type of data to the first digital twin, wherein sending the second type of data comprises synchronizing with the first digital twin;
determining, at a first time, that a second remote system or a device is attempting to send a first command to the vehicle;
determining that the second remote system or the device is within a threshold distance of the vehicle;
sending, based on the determination that the second remote system or the device is within the threshold distance of the vehicle, the command to the vehicle via the first digital twin instead of the second digital twin;
determining, at a second time, that the second remote system or the device is attempting to send a second command to the vehicle;
determining, at a second time, that the second remote system or the device is outside of the threshold distance of the vehicle; and
sending, based on the determination that the second remote system or the device is outside of the threshold distance of the vehicle, the command to the vehicle via the second digital twin instead of the first digital twin.

11. The method of claim 10, wherein the first digital twin and the second digital twin include a digital representation of the first vehicle sub-system and a digital representation of the second vehicle sub-system.

12. The method of claim 11, wherein the first digital twin and the second digital twin include a first artificial intelligence model associated with the digital representation of the first vehicle sub-system and a second artificial intelligence model associated with the digital representation of the second vehicle sub-system.

13. The method of claim 12, wherein the first artificial intelligence model is configured to produce an output used to adjust a configuration of the first vehicle sub-system.

* * * * *